United States Patent Office 2,875,162
Patented Feb. 24, 1959

2,875,162

VINYLPHENYL ALIPHATIC AMINOCARBOXYLIC ACID POLYMERS

Leo R. Morris, Midland, Mich., assignor to The Dow Chemical Company, Midland, Mich., a corporation of Delaware No Drawing. Application October 12, 1956
Serial No. 615,508

16 Claims. (Cl. 260—2.1)

This invention concerns a new class of resinous polymers obtained by polymerizing vinylphenyl aliphatic aminocarboxylic compounds of the class represented by the formula

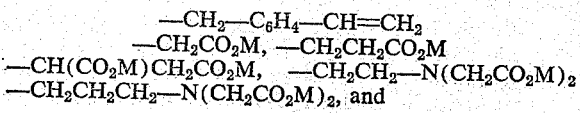

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$, —$CH_2$—$C_6H_4$—$CH=CH_2$
—$CH_2CO_2M$, —$CH_2CH_2CO_2M$
—$CH(CO_2M)CH_2CO_2M$, —$CH_2CH_2$—$N(CH_2CO_2M)_2$
—$CH_2CH_2CH_2$—$N(CH_2CO_2M)_2$, and

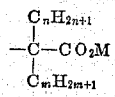

where $n$ is an integer from 1 to 4 and $m$ is an integer from 0 to 2, M is a member of the group consisting of hydrogen, ammonium bases, and metals, and wherein at least one of the radicals represented by the symbols $R_1$, $R_3$, and $R_4$ contains a carboxyl group.

The products of the invention are solid resinous polymers that possess a unique combination of properties, i. e. the properties of resinous polymers, the properties of amphoteric ion exchange resins, and the properties of chelation agents for certain metal ions. Although all of the products of this invention possess these common properties, they do not necessarily possess all of these properties to the same degree. Individual products of this invention can readily be distinguished from other individual products and are particularly adapted to specific uses.

Anion exchange resins containing active amino groups and cation exchange resins containing active carboxyl groups are, of course, already known. The new products of this invention are unique in that these products contain a plurality of groups having both amino and carboxyl groups at least one of each of which is attached to the same or adjacent carbon atoms, i. e. α-, or β-aminocarboxylic acid groups. Because of this particular combination of functional groups, the products of this invention form stable chelates with many polyvalent metal ions such as copper, mercury, cobalt, iron, nickel, manganese, lead, and the like. They do not form chelates with alkali metal ions. In most instances, they form weak chelates with alkaline earth metal ions, e. g. with Mg, Ca, Ba and Sr.

The complex chelates of these resins with chelate-forming metal ions differ from the reaction products of cation exchange resins and metal ions in that the cation exchange resin metal compositions are simple ionizable salts whereas the present resin chelates of metals are inherently molecular complexes possessing one or more coordinate covalent linkages. Since the chelate structure is much more stable than simple salt structures, the complexes of chelate-forming metals with the present chelating resins are much more stable than simple ion exchange resin salts. For this reason, the present chelating resins are particularly advantageous for use in removing chelate-forming metal ions from liquid compositions comprising the same, even in extremely dilute concentrations, in separating chelate-forming metal ions from non-chelate-forming metal ions, and in selectively separating chelate-forming metal ions from each other on the basis of different degrees of stability of the corresponding chelate complexes.

The resinous polymers of this invention are homopolymers or interpolymers of two or more vinylphenyl aliphatic α- or β-aminocarboxylic acids of the class represented by the formula first given above.

Specific examples of such polymerizable vinylphenyl aliphatic α- and β-aminocarboxylic acids are as follows:

N,N-bis(ar-vinylbenzyl)glycine
N-(ar-vinylbenzyl)sarcosine
N-(ar-vinylbenzyl)alanine
N,N-bis(ar-vinylbenzyl)alanine
N-(ar-vinylbenzyl)-β-alanine
N,N-bis(ar-vinylbenzyl)-β-alanine
N-(ar-vinylbenzyl)-2-aminobutyric acid
N-(ar-vinylbenzyl)-2-aminoisobutyric acid
N-(ar-vinylbenzyl)isovaline
N-(ar-vinylbenzyl)valine
N-(ar-vinylbenzyl)norvaline
N-(ar-vinylbenzyl)leucine
N-(ar-vinylbenzyl)isoleucine
N-(ar-vinylbenzyl)iminodiacetic acid
N-(ar-vinylbenzyl)-2-(vinylphenyl)glycine
N-carboxymethyl-N-(ar-vinylbenzyl)aspartic acid
2-(vinylphenyl)iminodiacetic acid
2-(vinylphenyl)nitrilotriacetic acid
N-(ar-vinylbenzyl)iminodiacetic acid
N-carboxymethyl-N-(ar-vinylbenzyl)alanine
N-carboxymethyl-N-(ar-vinylbenzyl)-β-alanine
N-carboxymethyl-N-(ar-vinylbenzyl)-2-aminobutyric acid
N-carboxymethyl-N-(ar-vinylbenzyl)-2 - aminoisobutyric acid
N-carboxymethyl-N-(ar-vinylbenzyl)isovaline
N-carboxymethyl-N-(ar-vinylbenzyl)valine
N-carboxymethyl-N-(ar-vinylbenzyl)norvaline
N-carboxymethyl-N-(ar-vinylbenzyl)leucine
N-carboxymethyl-N-(ar-vinylbenzyl)isoleucine
N-(ar-vinylbenzyl)aspartic acid
N,N-bis(ar-vinylbenzyl)aspartic acid
N-(ar-vinylbenzyl-3,3'-iminodipropionic acid
2-(vinylphenyl)glycine
3-(vinylphenyl)-β-alanine
3-(vinylphenyl)-3-aminobutyric acid
N-carboxymethyl-N-(ar-vinylbenzyl) - 2 - (vinylphenyl) glycine These vinylphenyl aliphatic α- and β-aminocarboxylic acids are described and claimed, together with suitable ways of preparing the same, in a concurrently filed application for Letters Patent, Serial Number 615,509, now U. S. Patent 2,840,603.

Some of these vinylphenyl aliphatic aminocarboxylic acids are prepared by interaction of ar-vinylbenzyl chloride and aliphatic aminocarboxylic acids having at least one hydrogen atom on the amino group. For instance, N-(ar-vinylbenzyl) iminodiacetic acid was prepared in the following manner.

Into a 5-liter round bottom flask fitted with a mechanical stirrer, reflux condenser, and dropping funnel were placed 133 grams of iminodiacetic acid, 1 liter of water, 1.5 liters of methanol, and a solution of 66 grams of sodium hydroxide in 250 ml. of water. Stirring was begun, and the contents of the flask were heated to reflux. From the dropping funnel there was added to the reaction mixture 153 grams of ar-vinylbenzyl chloride over a period of one hour. After approximately one-fourth of the ar-vinylbenzyl chloride had been added, another portion of 66 grams of sodium hydroxide in 250 ml. of water was added all at once to the reaction mixture, and the addition of ar-vinylbenzyl chloride was continued. Heating of the reaction mixture was discontinued after completion of the addition of the ar-vinylbenzyl chloride, but stirring was continued for a further 30 minutes.

The methanol was distilled from the reaction mixture, and the cooled aqueous residue was four times extracted with 25-ml. portions of chloroform. A small amount of decolorizing carbon was stirred into the aqueous solution and the mixture was filtered. The clear filtrate was heated to drive off traces of chloroform, and was cooled and acidified with concentrated hydrochloric acid to a pH value of 2. The white solid crystalline precipitate that formed was collected on a filter and dried. The crystalline product consisted substantially of N-(ar-vinylbenzyl) iminodiacetic acid and sodium chloride. Recrystallization from water produced substantially pure N-(ar-vinylbenzyl)iminodiacetic acid.

In a similar manner, N,N-bis(ar-vinylbenzyl)glycine was made in the following way.

Into a 1-liter, 3-necked flask was charged 75.1 g. of glycine, 100 ml. of dioxane, and 300 ml. of water at 60° C. To the resulting mixture there were concurrently, separately, and slowly added 76.3 g. of ar-vinylbenzyl chloride and a solution of 77 ml. of 19.5 N sodium hydroxide solution in 75 ml. of water, the additions being made over a 45 minute period with continued stirring while the temperature of the reaction mixture was maintained at 70° C. The rate of addition of the sodium hydroxide solution was such as to maintain the pH value of the reaction mixture in the range from 8 to 10 during the course of the reaction.

After standing overnight at room temperature, the reaction mixture was extracted with chloroform. The chloroform extract was acidified with hydrochloric acid and diluted with water, whereupon a slurry of crystalline solid formed. The solid N,N-bis(ar-vinylbenzyl) glycine was collected on a filter, was washed with water and dried.

N-(ar-vinylbenzyl)isovaline was made by the following procedure. A mixture of 200 ml. of water, 50 ml. of dioxane and 47 g. of isovaline, together with a trace of hydroquinone, was heated to a temperature in the range from 55° to 60° C. in a stirred reaction vessel fitted with reflux condenser and dropping funnels. Over a period of one hour, there were concurrently added to the reaction mixture 15.3 g. of ar-vinylbenzyl chloride and 31.2 g. of sodium hydroxide.

After an additional hour of stirring, the reaction mixture was diluted with an equal volume of water and then was extracted with chloroform. The extracted water solution was acidified with hydrochloric acid to a pH value of 5.5, whereupon a white solid precipitate formed. The solid was collected, washed and dried to obtain 9.7 g. of N-(ar-vinylbenzyl)isovaline.

2-(p-vinylphenyl)glycine was obtained by the following procedure. A solution of 132 g. of p-vinylbenzaldehyde in 250 ml. of methanol was added to a solution of 53.5 g. of ammonium chloride and 51.0 g. of sodium cyanide in 100 ml. of concentrated ammonium hydroxide and 200 ml. of water. To the reaction mixture was added approximately one gram of tert-butylcatechol and the reaction mixture was heated with intermittent stirring at approximately 50° C. for one hour. The resulting reaction mixture was diluted with an equal volume of water, and treated with a solution of 160 g. of sodium hydroxide in one liter of water and 250 ml. of methanol.

The resulting mixture was heated at reflux for one hour, cooled, and extracted with 200 ml. of benzene. The benzene extract was in turn extracted with a small amount of 1 N sodium hydroxide solution. The sodium hydroxide extract was combined with the main aqueous reaction mixture and the combined mixture was acidified with dilute hydrochloric acid to a pH value of approximately 6. The yellow solid precipitate was collected, washed with water, and redissolved in dilute hydrochloric acid. After treatment with decolorizing carbon and filtration through filter aid, the clear acid solution was partially neutralized with sodium hydroxide solution to a pH value of approximately 6. The precipitated solid was collected, washed and dried to provide 37.9 g. of 2-(p-vinylphenyl)glycine.

N-(ar-vinylbenzyl)-2-(p-vinylphenyl)glycine was prepared by the following procedure. A mixture of 2 g. of 2-(p-vinylphenyl)glycine, 50 ml. of water and 10 ml. of dioxane was heated to 70° C. A total of 1.7 g. of ar-vinylbenzyl chloride was added in two portions about 15 minutes apart while the reaction mixture was stirred and the temperature was maintained about 70° C. The pH value of the reaction mixture was maintained between 9 and 11 by adding 2 ml. of 50 percent by weight sodium hydroxide solution dropwise as needed over a one hour period. After 4.5 hours of heating and stirring, the reaction mixture was cooled and filtered. The filtrate was extracted with ether and the aqueous layer was acidified with hydrochloric acid to a pH value of about 5. A precipitated pale yellow solid was collected and washed with water. The solid was redissolved in dilute aqueous alkali and reprecipitated with hydrochloric acid. The reprecipitated N - (ar - vinylbenzyl) - 2 - (p - vinylphenyl)glycine was collected, washed and dried.

N-(ar-vinylbenzyl)aspartic acid was prepared by the following procedure. A solution of 34 g. of ar-vinylbenzyl amine hydrochloride in 200 ml. of water was made alkaline by addition thereto of a solution of 9.6 g. of sodium hydroxide in 80 ml. of water. The liberated ar-vinylbenzyl amine was extracted from the aqueous mixture with one 60-ml. and two 40-ml. portions of ether. After drying over anhydrous $Na_2SO_4$, the combined ether solutions were added to 68.8 g. of diethyl maleate. The resulting mixture was allowed to stand at room temperature for six days, after which 200 ml. of water and 16 ml. of concentrated hydrochloric acid were added with agitation. The ethereal layer was withdrawn and the aqueous layer was extracted with 20 ml. of ether. The aqueous layer was made strongly basic with 50 percent by weight sodium hydroxide, thereby precipitating an oil. The oil was extracted from the aqueous solution with two 20-ml. portions of ether. The ether extract was dried over anhydrous $Na_2SO_4$. Evaporation of the ether produced 49.1 g. of crude diethyl N-(ar-vinylbenzyl)aspartate. A mixture of 49.1 g. of the crude ester, 16.1 g. NaOH, and 150 ml. of water was heated under reflux for approximately three hours until the oily layer disappeared. The hydrolysis mixture was acidified to a pH value of approximately 2 by addition thereto of hydrochloric acid. The solid precipitate was collected, washed, and recrystallized from 70 ml. of boiling water. The recrystallized product was collected, washed and dried to obtain 30 g. of N-(ar-vinylbenzyl) aspartic acid.

Some of the vinylphenyl aliphatic aminocarboxylic acids are prepared by reaction of an ar-vinylbenzylamino compound having at least one hydrogen atom on the amino group with a haloacetic acid in an alkaline aqueous reaction mixture. For instance, the preparation of 2-(p-vinylphenyl)iminodiacetic acid and 2-(p-vinylphenyl) nitrilotriacetic acid was carried out as follows. To a mixture of 3 g. of 2-(p-vinylphenyl)glycine, 3 g. of sodium carbonate, and 25 ml. of water, were added a solution of 4.5 g. of sodium chloroacetate in 10 ml. of water and a trace of hydroquinone. The resulting mixture was heated at temperatures in the range from 70° to 80° C.

for 8 hours, during which another 3 g. of sodium carbonate was added to the reaction mixture. After filtering the reaction mixture, the filtrate was acidified to a pH value of 2.5 with hydrochloric acid and was concentrated by evaporation in an air stream. The solid precipitate was collected, washed and dried. This product was a mixture of 2-(p-vinylphenyl)iminodiacetic acid (condensation product of one molecular proportion of chloroacetic acid) and 2-(p-vinylphenyl)nitrilotriacetic acid (condensation product of two molecular proportions of chloroacetic acid). Recrystallization from hot water caused the separation of the mixture into two fractions, the least soluble product being substantially the 2-(p-vinylphenyl)iminodiacetic acid. The more soluble product was substantially the 2-(p-vinylphenyl)nitrilotriacetic acid.

These vinylphenyl aliphatic α- and β-aminocarboxylic acids can be polymerized in mass, i. e., in the absence of diluents, or in solution, or in suspension in non-solvent media to obtain the resinous products of this invention, as illustrated by examples to follow. Homopolymers are obtained from individual vinylphenyl aliphatic α- or β-aminocarboxylic acids, and interpolymers are obtained by polymerization of mixtures of two or more of such polymerizable amino acids. Polymerization of these amino acids is accelerated by heat, by activation with ionizing radiations, and by contact with catalysts such as α,α'-azobisisobutyronitrile and the peroxygen compounds, e. g. persulfates and peroxides.

In most instances, the solid resinous polymers of the vinylphenyl aliphatic aminocarboxylic acids are insoluble or only sparingly soluble in water. Some of the non-crosslinked polymers, e. g. of mono-vinyl monomers, are soluble in aqueous alkali. The cross-linked polymers, e. g. of poly-vinyl monomers, are generally insoluble or only swellable with water or aqueous alkali.

The following examples illustrate the preparation, properties and uses of some of the resinous polymers of these vinylphenyl aliphatic aminocarboxylic acids, but the examples are not to be construed as limiting the invention.

In the examples the chelate structures of metal salts are expressed in terms of the number of moles of amino acid ligand per atom of metal in the chelate complex. Studies of the chelates and determination of their stability constants were carried out substantially in accordance with the techniques described by Chaberek and Martell, J. Am. Chem. Soc. 74, 5052 (1952) and by J. Bjerrum, "Metal Ammine Formation in Aqueous Solution," pp. 2–38, published by P. Haase and Son, Copenhagen (1941).

*Example 1.—Homopolymer of N-(ar-vinylbenzyl)iminodiacetic acid*

A solution of 23 grams of N-(ar-vinylbenzyl)iminodiacetic acid in 1300 mls. of water at a temperature of 90° C. was irradiated with ultraviolet light for three days. A pale yellow, fine powder, insoluble solid was separated from the solution in amount of approximately 11 grams. A further amount of solid was obtained by concentration and irradiation of the residual aqueous solution.

The insoluble solid was a homopolymer of N-(ar-vinylbenzyl)iminodiacetic acid. Potentiometric titrations of the polymer were carried out in closed titration cells, with agitation and under an atmosphere of nitrogen free of carbon dioxide, the pH of the sample being measured by means of a glass calomel electrode system. The titrations were carried out by adding acid or base solutions in small increments and allowing equilibrium to be attained in each instance before adding the next increment of reagent.

From data obtained by so titrating a sample of polymeric N-(ar-vinylbenzyl)iminodiacetic acid, dispersed to a concentration of $1.831 \times 10^{-3}$ molar in a 1 N KCl solution, at 30° C., with standardized 0.1 N KOH solution, the acid dissociation constants for the polymer were calculated on the assumption of a homogeneous, single phase system, and were found to be as follows:

$$k_1 = 4.24 \times 10^{-4}$$
$$k_2 = 5.58 \times 10^{-10}$$

These values are somewhat lower than the corresponding values for the monomeric material.

Addition of cupric ions, e. g. as $CuCl_2 \cdot 2H_2O$, to a water dispersion of the polymeric N-(ar-vinylbenzyl)iminodiacetic acid caused the resin to turn blue, while the water phase remained colorless.

From a titration of the resin in the presence of cupric ions in the manner described above in this example, the polymeric N-(ar-vinylbenzyl)iminodiacetic acid was found to form both 1:1 and 2:1 chelates (moles of resin: metal ion) with cupric ions, having chelate stability constants, calculated on the assumption of a homogeneous, single phase system, as follows:

$$K_1 = 5.62 \times 10^9$$
$$K_2 = 1.38 \times 10^6$$

Addition of ferric ions, e. g. as $FeCl_3$, to the water dispersion of the polymeric N-(ar-vinylbenzyl)iminodiacetic acid caused formation of a 1:1 chelate. Upon addition of alkali, 2:1 and 3:1 chelates (moles of resin:ferric ion) were formed, hydrolysis occurring above a pH value of 8.5. The stability constants for these chelates were found to be as follows:

$$K_1 = 1.20 \times 10^{10}$$
$$K_2 = 4.46 \times 10^7$$
$$K_3 = 7.94 \times 10^4$$

Polymeric N-(ar-vinylbenzyl)iminodiacetic acid forms stable chelates with iron and was used to remove iron ions from water solution, either by stirring the resin into, and filtering the resin chelate from, iron-containing aqueous solutions, or by passing such iron-containing liquids through a layer of the resin.

*Example 2.—Homopolymer of N,N-bis(ar-vinylbenzyl)glycine*

A mixture of 17.8 g. of N,N-bis(ar-vinylbenzyl)glycine and 50 ml. of 1 N NaOH solution was heated to reflux and 14.4 mg. of sodium persulfate was added. After two hours, another 14.4 mg. of sodium persulfate was added and refluxing was continued. After 18 hours, 100 mg. of sodium persulfate and 150 ml. of water were added. After 48 hours the gelled product was diluted with one liter of water. Water was separated from the gel, and the gel was dispersed in one liter of dilute sodium hydroxide. The dispersion was heated, and filtered; the gel was thoroughly washed with water and dried under vacuum to obtain 16.5 g. of brittle yellow resinous polymer of N,N-bis(ar-vinylbenzyl)glycine.

Acid-base titrations of 0.1018 g. of the polymer dispersed in 200 ml. of 1 N KCl solution were carried out under a $CO_2$-free nitrogen atmosphere using the equilibrium method of incremental addition of reagents as described in Example 1. Similar titrations after addition of 0.0282 g. $CuCl_2 \cdot 2H_2O$ showed that the polymer formed 1:1 and 2:1 chelates with copper, the stability constants being as follows:

$$K_1 = 2.22 \times 10^5$$
$$K_2 = 4.20 \times 10^4$$

*Example 3.—Copolymer of N-(ar-vinylbenzyl)iminodiacetic acid and N,N-bis(ar-vinylbenzyl)glycine*

A solution containing 0.68 g. of N,N-bis(ar-vinylbenzyl)glycine, 16.2 g. of N-(ar-vinylbenzyl)iminodiacetic acid, 50 ml. of 1 N KOH, and 300 ml. of water was heated to reflux. Sodium persulfate was added in several small portions over a period of about 8 hours to a total of 1.33 g. sodium persulfate. Acidification of the reaction mixture produced 13.35 g. of resinous copolymer of N-(ar-vinylbenzyl)iminodiacetic acid and N,N-bis(ar-vinylbenzyl)glycine.

*Example 4.—Homopolymer of 2-(p-vinylphenyl)-glycine*

A solution of 2 g. of 2-(p-vinylphenyl)glycine and 0.01 g. of sodium persulfate in 20 ml. of 1 N NaOH was heated to incipient reflux. After 72 hours, 0.02 g. of sodium persulfate was added. After another 120 hours at incipient reflux, 0.05 g. of α,α'-azobisisobutyronitrile was added. Twenty-four hours later, 0.05 g. of α,α'-azobisisobutyronitrile was added. After a total reaction time of 168 hours, the reaction mixture was cooled, acidified to a pH value of approximately 5 by addition thereto of dilute hydrochloric acid, and was filtered. The precipitated solid was washed with water and dried, whereby there was obtained polymerized 2-(p-vinylphenyl)glycine.

*Example 5.—Homopolymer of N-(ar-vinylbenzyl)-aspartic acid*

A solution of 0.25 g. of N-(ar-vinylbenzyl)aspartic acid and 0.003 g. of sodium persulfate in 25 ml. of water was heated to reflux. After 23 hours, 0.003 g. of sodium persulfate was added, and reflux was continued for 27 hours to obtain 0.18 g. of tan-colored, resinous polymerized N-(ar-vinylbenzyl)aspartic acid.

*Example 6.—Homopolymer of N-(ar-vinylbenzyl)-2-(p-vinylphenyl)glycine*

An alkaline (sodium hydroxide) solution of 10 percent by weight N-(ar-vinylbenzyl)-2-(p-vinylphenyl)glycine and 0.2 percent by weight α,α'-azobisisobutyronitrile was heated at 70° C. for four days to obtain a gel which was dialyzed against water. The dialyzed gel was collected and dried to obtain a cross-linked homopolymer of N-(ar-vinylbenzyl)-2-(p-vinylphenyl)glycine.

*Example 7.—Homopolymer of N-(ar-vinylbenzyl)isovaline*

An alkaline (sodium hydroxide) solution of N-(ar-vinylbenzyl)isovaline (10 percent by weight) and α,α'-azobisisobutyronitrile (0.2 percent by weight) was heated at 70° C. for four days to obtain polymerized N-(ar-vinylbenzyl)isovaline.

*Example 8.—Homopolymer of 2-(p-vinylphenyl)nitrilotriacetic acid*

An alkaline (sodium hydroxide) solution of 2-(p-vinylphenyl)nitrilotriacetic acid, sodium salt (20 percent by weight), and α,α'-azobisisobutyronitrile (0.2 percent by weight) was heated at 70° C. for four days to obtain polymerized 2-(p-vinylphenyl)nitrilotriacetic acid. The polymer formed stable chelates with copper and like metal ions.

*Example 9.—Copolymer of N,N-bis(ar-vinylbenzyl)glycine and N-(ar-vinylbenzyl)isovaline*

A water solution that was $3.26 \times 10^{-4}$ M in respect to N,N-bis(ar-vinylbenzyl)glycine and $9.28 \times 10^{-4}$ M in respect to N-(ar-vinylbenzyl)isovaline was treated with sodium hydroxide solution until the pH value was approximately 9, and sodium persulfate was added to the solution to the extent of 0.57 percent by weight of the total monomers. The solution was heated at reflux temperature for 9 hours to produce a turbid dispersion. The dispersion was acidified to a pH value approximately 2, and the precipitated copolymer of N,N-bis(ar-vinylbenzyl)glycine and N-(ar-vinylbenzyl)isovaline was collected, washed with acetone, and dried. The resin formed a strong chelate structure with cupric ions.

*Example 10.—Copolymer of N-(ar-vinylbenzyl)iminodiacetic acid and N-(ar-vinylbenzyl)isovaline*

To a water solution that was $1.86 \times 10^{-3}$ M in respect to sodium N-(ar-vinylbenzyl)iminodiacetate and $$4.64 \times 10^{-4} \text{ M}$$

in respect to N-(ar-vinylbenzyl)isovaline, sodium salt, at a pH value of 9, there was added α,α'-azobisisobutyronitrile in amount corresponding to 0.51 percent by weight of the total monomers, and the resulting solution was heated at reflux temperature. After 5 hours, there was added to the solution sodium persulfate in amount corresponding to 0.51 percent by weight of the total monomers initially charged, and refluxing was continued for 7 hours. The clear, slightly viscous solution was acidified to a pH value of approximately 2, and the precipitated copolymer of N-(ar-vinylbenzyl)iminodiacetic acid and N-(ar-vinylbenzyl)isovaline was collected, washed with acetone, and dried.

*Example 11.—Copolymer of 2-(p-vinylphenyl)nitrilotriacetic acid and N-(ar-vinylbenzyl)-2-(p-vinylphenyl)glycine*

To a water solution that was $8.53 \times 10^{-4}$ M in respect to sodium 2-(p-vinylphenyl)nitrilotriacetate and $1.71 \times 10^{-4}$ M in respect to N-(ar-vinylbenzyl)-2-(p-vinylphenyl)glycine, sodium salt, at a pH value of 9, was added sodium persulfate in amount corresponding to 0.67 percent by weight of the total monomers, and the resulting solution was heated at reflux temperature. After 7 hours α,α'-azobisisobutyronitrile was added to the solution in amount equal to the amount of sodium persulfate charged earlier, and refluxing was continued for 16 hours. The resulting solution was acidified with HCl to pH 2, and the precipitated copolymer of 2-(p-vinylphenyl)nitrilotriacetic acid and N-(ar-vinylbenzyl)-2-(p-vinylphenyl)glycine was collected, washed with acetone, and dried.

*Example 12.—Copolymer of N-(ar-vinylbenzyl)iminodiacetic acid and 2-(p-vinylphenyl)glycine*

To a water solution that was $2 \times 10^{-3}$ M in respect to sodium N-(ar-vinylbenzyl)iminodiacetate and $2 \times 10^{-3}$ M in respect to 2-(p-vinylphenyl)glycine, sodium salt, at a pH value of 9, there was added α,α'-azobisisobutyronitrile in amount corresponding to 0.61 percent by weight of the total monomers, and the resulting solution was heated at reflux temperature for 7 hours. The resulting solution was acidified with HCl to pH 2, and the precipitated copolymer of N-(ar-vinylbenzyl)iminodiacetic acid and 2-(p-vinylphenyl)glycine was collected, washed with acetone, and dried. The resin product formed a strong chelate structure with cupric ions.

In foregoing Examples 1, 2, 3, 5, 6, 7, 9, 10, 11 and 12, the ar-vinylbenzyl compounds employed as starting materials were mixtures of isomers consisting essentially of from 60 to 65 percent by weight of the p-vinylbenzyl isomer and from 40 to 35 percent by weight of the o-vinylbenzyl isomer. In Examples 4 and 8, the starting material was substantially the p-vinylphenyl isomer. In place of these particular isomers and mixture of isomers, there can be used any of the individual isomers, i. e., the o-vinyl-, the m-vinyl-, or the p-vinyl isomer, or mixtures of two or more of such isomers, to obtain polymers and interpolymers of the isomeric vinylphenyl aliphatic aminocarboxylic acids.

The vinylphenyl aliphatic aminocarboxylic acid polymers are solid resinous products which are capable of forming salts of the carboxylic acid group by reaction with ammonium bases, such as ammonia and organic amines, and with metal bases, such as alkali metal and alkaline earth metal bases. Some of the metal salts, as shown in the foregoing examples, have chelate structures. In some instances, metal ions form chelates with the free-acid form of the resin. Usually, stable chelates were formed only with the salts of the carboxylic acid group. Many of these chelate salts are stable at neutral to alkaline pH values, but are dissociated at low pH values. Therefore, the amino acid resins can be regenerated from their chelate salt forms by treatment thereof with strong acids such as hydrochloric acid.

The products of this invention possess useful and advantageous properties as chelating and sequestering agents for metal ions. They are particularly useful in removing chelate-forming metal ions from solutions containing the same, even extremely dilute solutions, and in separating chelate-forming metal ions from non-chelate-forming metal ions. These chelating resins are also useful in selectively separating chelate-forming metal ions from each other on the basis of the stability or strength of the respective metal chelate structures.

For purpose of specific illustration of the use of these chelating resins, the following tests were carried out. An intimate mechanical mixture was prepared comprising two parts by weight of small pieces of polystyrene resin foam and one part by weight of the homopolymeric N-(ar-vinylbenzyl)-iminodiacetic acid obtained in Example 1. This mixture was placed in a glass tube 15 mm. in diameter and two feet long to provide a fluid-permeable solid resin bed. One hundred milliliters of a $5 \times 10^{-3}$ M aqueous solution of ferric chloride was slowly passed into the resin bed. Ferric ions were removed from the solution during passage through the bed and were retained by the resin. After rinsing the resin bed with water, the iron-containing resin was regenerated to the acid form by elution with 1 N HCl solution, ferric chloride being removed in the effluent.

In another test 0.1085 g. of the homopolymeric N-(ar-vinylbenzyl)iminodiacetic acid obtained in Example 1 was dispersed by stirring into 200 ml. of aqueous solution that was 1 N in respect to KCl and $1.0155 \times 10^{-3}$ M in respect to cupric chloride. The resin particles turned blue in color while the aqueous solution became colorless. The resin particles were separated by filtration to yield a filtered solution that was substantially free of copper ions. The copper-containing resin particles were regenerated by washing with 1 N HCl solution.

I claim:

1. An addition polymer consisting essentially of recurring units corresponding to polymerizable vinylphenyl aliphatic aminocarboxylic acid compounds having the formula

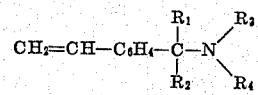

wherein the symbol $R_1$ represents a radical selected from the group consisting of —H, —$CO_2M$, and —$CH_2CO_2M$, the symbol $R_2$ represents a radical selected from the group consisting of —H and —$CH_3$, each of the symbols $R_3$ and $R_4$ individually represents a radical selected from the group consisting of —H, —$CH_3$, —$CH_2$—$C_6H_4$—CH=$CH_2$
—$CH_2CO_2M$
—$CH_2CH_2CO_2M$
—$CH(CO_2M)CH_2CO_2M$
—$CH_2CH_2$—$N(CH_2CO_2M)_2$
—$CH_2CH_2CH_2$—$N(CH_2CO_2M)_2$ and

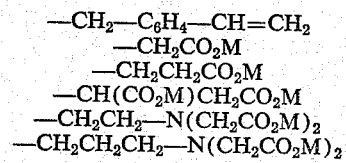

wherein $n$ is an integer from 1 to 4 and $m$ is an integer from 0 to 2, M is a member of the group consisting of hydrogen, ammonium bases, and metals, and wherein at least one of the radicals represented by the symbols $R_1$, $R_3$, and $R_4$ contains a carboxyl group.

2. An addition polymer according to claim 1 which is a copolymer consisting essentially of recurring units corresponding to a mixture of such vinylphenyl aliphatic aminocarboxylic acid compounds.

3. An addition polymer according to claim 1 which is a copolymer consisting essentially of recurring units corresponding to a mixture of such vinylphenyl aliphatic aminocarboxylic acid compounds and including units corresponding to a N-(ar-vinylbenzyl)iminodiacetic acid compound.

4. An addition polymer according to claim 1 which is a copolymer consisting essentially of recurring units corresponding to a mixture of such vinylphenyl aliphatic aminocarboxylic acid compounds and including units corresponding to a N-(ar-vinylbenzyl)aspartic acid compound.

5. An addition polymer according to claim 1 which is a copolymer consisting essentially of recurring units corresponding to a mixture of such vinylphenyl aliphatic aminocarboxylic acid compounds and including units corresponding to a 2-(vinylphenyl)glycine compound.

6. An addition polymer according to claim 1 which is a copolymer consisting essentially of recurring units corresponding to a mixture of such vinylphenyl aliphatic aminocarboxylic acid compounds and including units corresponding to a 2-(vinylphenyl)nitrilotriacetic acid compound.

7. An addition polymer according to claim 1 which is a copolymer consisting essentially of recurring units corresponding to a mixture of such vinylphenyl aliphatic aminocarboxylic acid compounds and including units corresponding to a N,N-bis(ar-vinylbenzyl)glycine compound.

8. An addition polymer according to claim 1 which is a homopolymer of one of such vinylphenyl aliphatic aminocarboxylic acid compounds.

9. An addition polymer according to claim 1 which is a homopolymer of a N-(ar-vinylbenzyl)iminodiacetic acid compound.

10. An addition polymer according to claim 1 which is a homopolymer of a N-(ar-vinylbenzyl)aspartic acid compound.

11. An addition polymer according to claim 1 which is a homopolymer of a 2-(vinylphenyl)glycine compound.

12. An addition polymer according to claim 1 which is a homopolymer of a 2-(vinylphenyl)nitrilotriacetic acid compound.

13. An addition polymer according to claim 1 which is a homopolymer of a N,N-bis(ar-vinylbenzyl)glycine compound.

14. A method of making an addition polymer which method comprises polymerizing by heating in the presence of a free-radical polymerization catalyst a polymerizable composition which contains as the only polymerizable material vinylphenyl aliphatic aminocarboxylic acid compounds having the formula

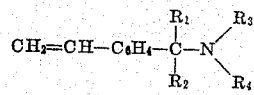

wherein the symbol $R_1$ represents a radical selected from the group consisting of —H, —$CO_2M$, and —$CH_2CO_2M$, the symbol $R_2$ represents a radical selected from the group consisting of —H and —$CH_3$, each of the symbols $R_3$ and $R_4$ individually represents a radical selected from the group consisting of —H, —$CH_3$, —$CH_2$—$C_6H_4$—CH=$CH_2$
—$CH_2CO_2M$
—$CH_2CH_2CO_2M$
—$CH(CO_2M)CH_2CO_2$
—$CH_2CH_2$—$N(CH_2CO_2M)_2$
—$CH_2CH_2CH_2$—$N(CH_2CO_2M)_2$ and

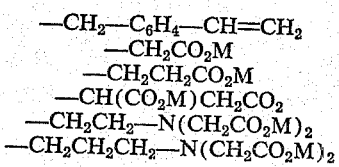

wherein $n$ is an integer from 1 to 4 and $m$ is an integer from 0 to 2, M is a member of the group consisting of hydrogen, ammonium bases, and metals, and wherein at least one of the radicals represented by the symbols $R_1$, $R_3$, and $R_4$ contains a carboxyl group.

15. A method according to claim 14 wherein the polymerizable composition contains as the only polymerizable material a mixture of such vinylphenyl aliphatic aminocarboxylic acid compounds, thereby making an addition copolymer.

16. The method according to claim 14 wherein the polymerizable composition contains as the only polymerizable constituent a single one of such vinylphenyl aliphatic aminocarboxylic acid compounds, thereby making an addition homopolymer.

References Cited in the file of this patent

UNITED STATES PATENTS

| | | |
|---|---|---|
| 2,500,025 | Dickey et al. | Mar. 7, 1950 |
| 2,632,001 | McMaster et al. | Mar. 17, 1953 |
| 2,694,702 | Jones | Nov. 16, 1954 |
| 2,697,080 | D'Alelio | Dec. 14, 1954 |